United States Patent [19]
Bertelsen et al.

[11] Patent Number: 4,846,970
[45] Date of Patent: Jul. 11, 1989

[54] CROSS-FLOW FILTRATION MEMBRANE TEST UNIT

[75] Inventors: Robert A. Bertelsen, Minnetonka; Douglas L. Olsen, Eden Prairie, both of Minn.

[73] Assignee: Osmonics, Inc., Minnetonka, Minn.

[21] Appl. No.: 65,327

[22] Filed: Jun. 22, 1987

[51] Int. Cl.⁴ .................. B01D 13/00; G01N 15/08
[52] U.S. Cl. .................................... 210/232; 73/38; 210/321.84; 210/433.1; 210/456; 210/475; 210/477; 422/101; 422/103
[58] Field of Search .............. 210/232, 236, 321.6, 210/321.84, 224, 227, 433.1, 456, 473, 475, 477; 422/48, 101, 103; 73/38, 64.3

[56] References Cited
U.S. PATENT DOCUMENTS

| | | | |
|---|---|---|---|
| 1,904,531 | 4/1933 | Raymond | 210/224 X |
| 3,556,302 | 1/1971 | Agranat | 210/321.84 |
| 4,375,415 | 3/1983 | Lavender | 210/321.84 |

Primary Examiner—W. Gary Jones
Attorney, Agent, or Firm—Dorsey & Whitney

[57] ABSTRACT

A cross-flow filtration membrane test unit having a bottom cell body, a top cell body and a pair of laterally spaced O-rings forming a seal therebetween. The bottom cell body is provided with a feed spacer cavity and the top cell body is provided with a permeate carrier cavity. A mechanism for receiving a test sample of membrane enables the membrane performance and characteristics to be tested in a manner which closely simulates actual full-scale operation.

13 Claims, 3 Drawing Sheets

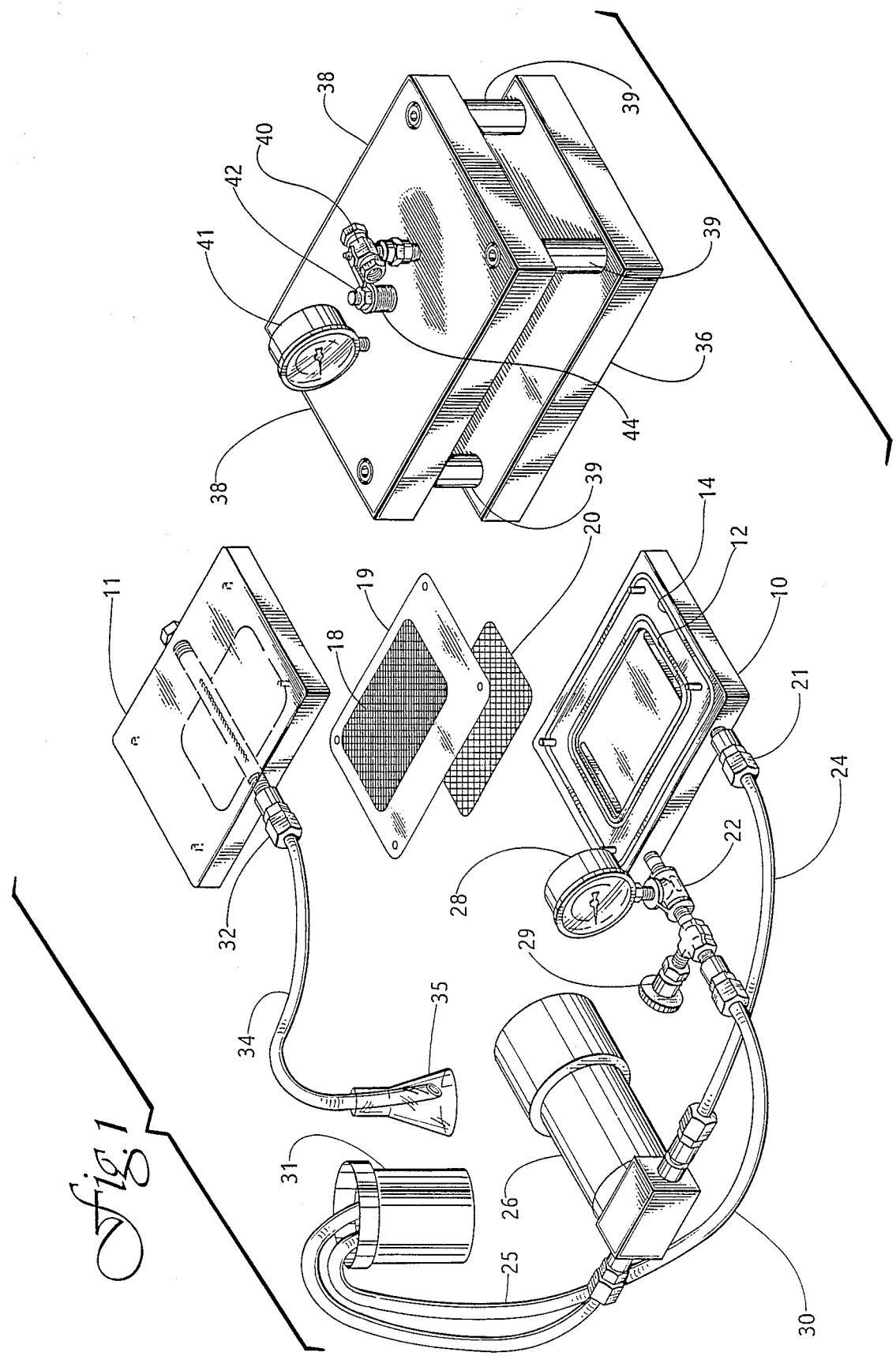

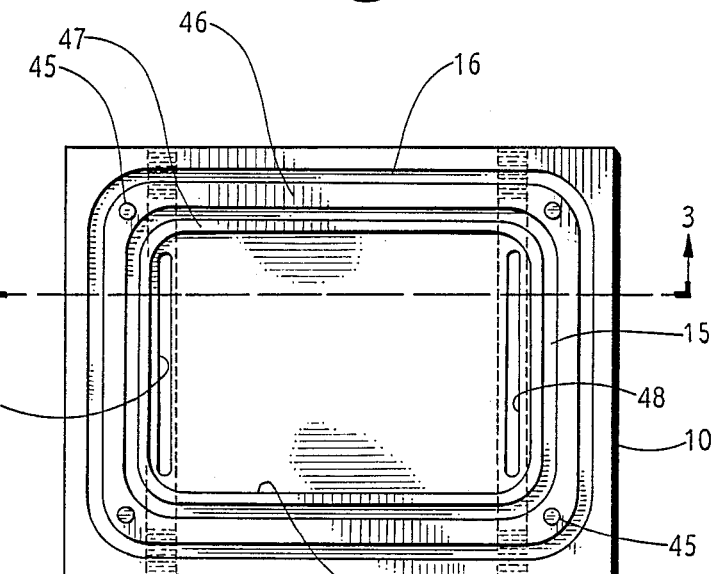
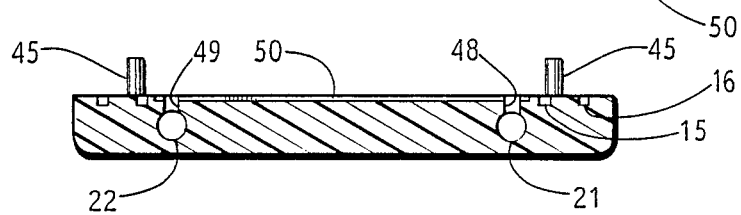
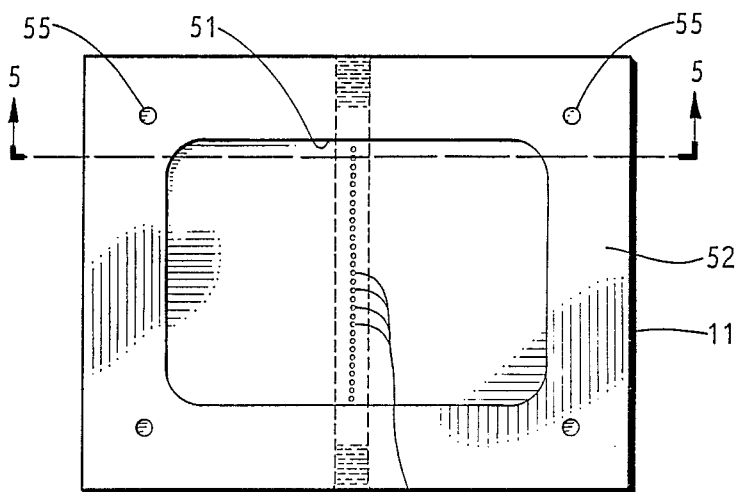

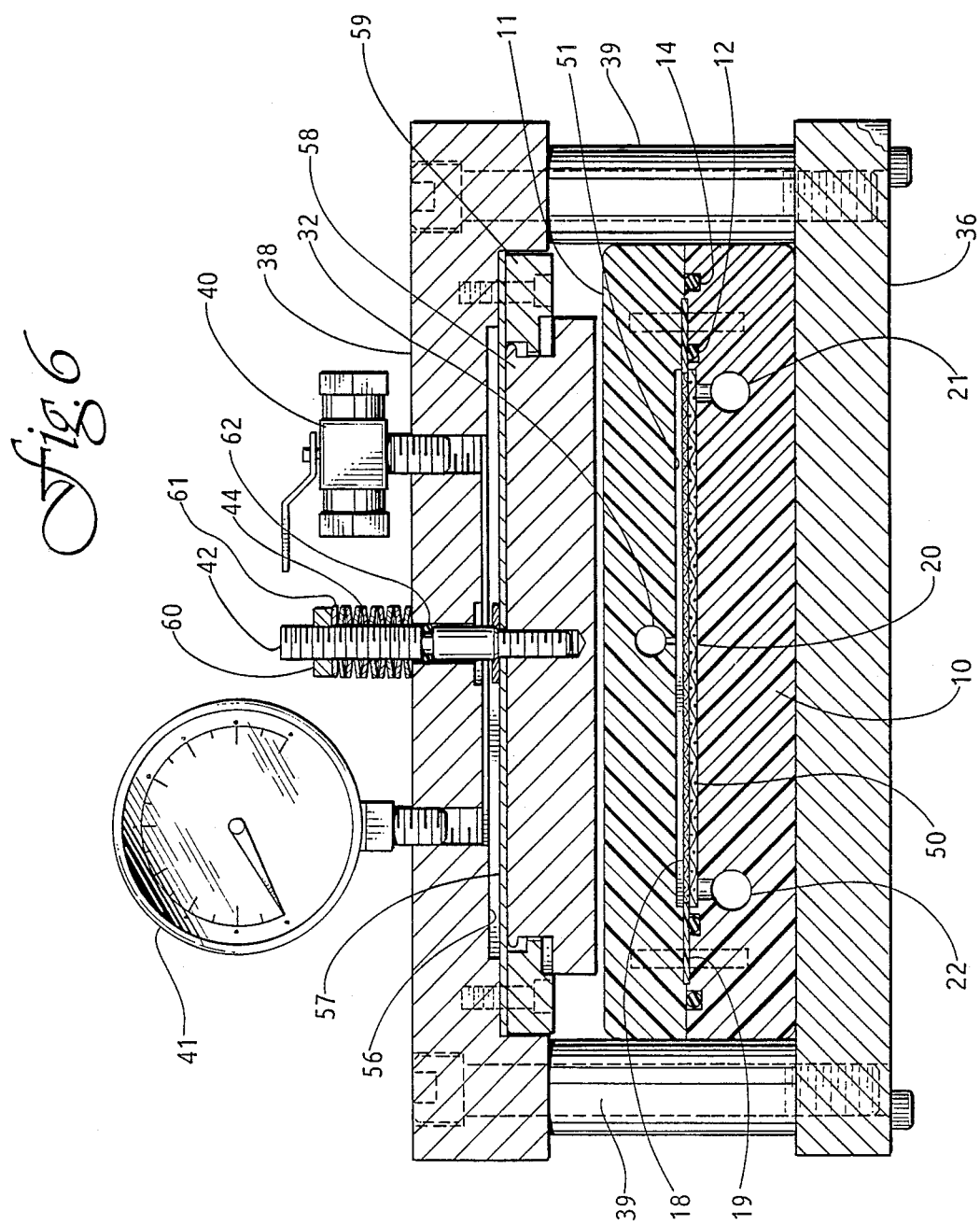

CROSS-FLOW FILTRATION MEMBRANE TEST UNIT

BACKGROUND OF THE INVENTION

The present invention relates generally to a filtration membrane test unit or cell, and more particularly, to a cross-flow filtration membrane test unit or cell which more closely simulates the flow dynamics within a full-size filter unit, thereby providing better prediction of membrane filter performance.

Much of filtration technology today involves, among others, ultrafiltration (UF) and microfiltration (MF), which utilizes filtration membranes to separate particles of a desired size from a liquid. In the normal operational environment, a liquid containing the particles to be filtered is pressurized via a pump or other means and exposed to one side of the filtration membrane. The liquid is allowed to flow across such membrane before exiting through a concentration port. Because of the high pressures involved, a portion of the liquid is forced through the membrane with the remainder of the liquid and all particles over a given particle size being rejected and removed from the system through the concentrate outlet.

Because of the vast number of different liquids, slurries, etc. that can be subject to filtration utilizing this technology, there are a large number of possible membrane materials that can also be used. In selecting the proper membrane material, consideration must be given to, among many others, its compatability with the liquid being filtered, the size of particle desired to be rejected by the membrane and the pore size of the membrane. The testing of the filtration performance and characteristics of a particular membrane can be quite time consuming and costly if one has to construct a full size system in order to properly test the membrane. As a result, several products in the form of membrane test devices have been developed for the purpose of trying to predict the filter and flow characteristics of the membrane under normal operating conditions.

Some of the most common membrane test devices currently being used include devices which utilize membrane cassettes. Typical membrane cassette test units include the Pellicon and Minitan test units manufactured by Millipore, the Sartocon I and II test units manufactured by Sartorius and the Novosette test unit manufactured by Filtron. These systems can best be described as including two pieces of membrane adhesively bonded or heat sealed to a piece of plastic. The principal limitations of the membrane cassette systems are that they are, of course, limited to the membranes within the cassette, they are quite expensive, and they fail to closely simulate the actual flow dynamics of the full scale device.

Another prior art membrane test device includes the Megaflow TM-100 manufactured by New Brunswick. This device uses a single piece of membrane and is a cross-flow filtration device which utilizes channels machined into the apparatus to direct the feed flow. Because of this, its ability to simulate the flow dynamics of the full-size filtration unit is limited.

Further, the mechanism in these prior test units for creating the seal around the membrane has been less than desirable and often results in an inadequate seal and therefore leakage. The prior systems also require significant time to change from one membrane to another.

Accordingly, there is a need in the art for a filtration membrane test unit which is inexpensive to operate, which requires less time to change over from one membrane to the next, which provides an improved seal and which more closely simulates the flow dynamics of the full-size system.

SUMMARY OF THE INVENTION

In contrast to the prior art, the present invention relates to a cross-flow filtration membrane test unit or cell which can be used to test the performance and flow characteristics of virtually any filtration membrane. The device of the present invention includes an improved means for more closely simulating the flow dynamics of the full-size unit by providing a means to receive a feed spacer for directing the inlet feed across the surface of the membrane. Because of the unique construction of the device of the present invention, this feed spacer can be changed to reflect the type of flow (laminar or turbulent) which is desired or the particular thickness of the feed spacer. This significantly improves the ability of the test unit of the present invention to more closely simulate the flow dynamics existing in the full scale system.

The unit of the present invention also provides a means for testing relatively small pieces of membrane, without requiring the same to be incorporated into a sealed cassette. For example, with the unit of the present invention, virtually any piece of membrane can be tested simply by cutting it to the appropriate size and providing it with appropriate positioning holes. The unit of the present invention also includes an improved seal system comprising a pair of laterally spaced O-rings.

The device of the present invention also includes an improved mechanism for forming the seal which comprises a pneumatic or hydraulic clamp or cell holder by which the test unit can be inserted and sealed in a matter of seconds.

Accordingly, it is an object of the present invention to provide an improved cross-flow filtration membrane test unit which is less expensive and has more flexibility than test units in the prior art.

Another object of the present invention is to provide a cross-flow filtration membrane test unit which includes means for more closely simulating the flow dynamics of the full-scale unit.

Another object of the present invention is to provide a cross-flow filtration membrane test unit in which the feed spacer can be changed to more closely simulate the actual flow conditions and thickness which will occur in the full-scale unit.

A further object of the present invention is to provide a cross-flow filtration membrane test unit with an improved means for sealing the membrane within the test unit.

A still further object of the present invention is to provide an improved cross-flow filtration membrane test unit in which the time needed to change over from one membrane to the other is significantly reduced.

These and other objects of the present invention will become apparent with reference to the drawings, the description of the preferred embodiment and the appended claims.

DESCRIPTION OF THE DRAWINGS

FIG. 1 is a pictorial, exploded view of the filtration membrane test unit of the present invention.

FIG. 2 is a top view of the bottom plate of the filtration membrane test unit of the present invention.

FIG. 3 is a sectional view of the bottom cell body of the test unit of the present invention as viewed along the section line 3—3 of FIG. 2.

FIG. 4 is a bottom view of the top cell body of the filtration membrane test unit of the present invention.

FIG. 5 is a sectional view of the test unit of the present invention as viewed along the section line 5—5 of FIG. 4.

FIG. 6 is a front view, partially in section, of the cell holder designed for use with the test cell of the present invention with a test unit secured therein

DESCRIPTION OF THE PREFERRED EMBODIMENT

General reference is first made to FIG. 1 comprising a pictorial, exploded view of the test unit of the present invention, with more detailed reference to FIGS. 2-6.

In general, the test unit or test cell of the present invention includes a bottom, generally rectangular cell body 10 and a generally rectangular top cell body 11 which are designed for sealing engagement with one another as a result of the pair of laterally spaced O-rings 12 and 14. The O-rings are positioned in appropriate O-ring grooves 15 and 16, respectively, (FIGS. 2 an 3) in the bottom cell body 10. A permeate carrier 18, a section of test membrane 19 and a section of test feed spacer 20 are positioned between the top and bottom cell bodies in the manner hereinafter described.

The bottom cell body 10 is provided with a feed inlet port 21 and a concentrate outlet port 22. The feed inlet port 21 is connected via the conduit 24 to a feed pump 26. The liquid feed is supplied to the pump 26 from a feed vessel 31 via the conduit 25. The concentrate outlet 22 is connected to a concentrate pressure gauge 28 and then to a concentrate valve 29 for the purpose of controlling the back pressure within the test unit. A conduit 30 directs the concentrate from the concentrate outlet 22 back to the feed vessel 31.

The top cell body 11 is provided with a permeate outlet 32. The outlet 32 is in turn connected with the conduit 34 for directing the permeate from the top cell body 11 to a permeate collection vessel 35.

The mechanism for creating the sealing force between the bottom and top cells, 10 and 11, is illustrated as a cell or test unit holder comprising a base 36, a vertically spaced, top piston holder 38 and a plurality of support posts 39 positioned at the corners of the base 36 and holder 38 to maintain such members in a rigid, vertically spaced position. As will be described in greater detail below with reference to FIG. 6, the cell holder also includes a pneumatic or hydraulic piston member for exerting a sealing force relative to the cell bodies 10 and 11.

The top surface of the piston holder 38 includes a pneumatic/hydraulic fitting 40 embodying a three way valve for supplying pneumatic or hydraulic fluid to the unit, a pressure gauge 41 for determining the pneumatic or hydraulic pressure within the cell holder and a return mechanism in the form of the elongated rigid member 42 and the return spring 44 for returning the piston member (FIG. 6) to its retracted position when the pneumatic or hydraulic pressure is released.

With more specific reference to FIGS. 2 and 3, the bottom cell body 10 includes a plurality of alignment posts 45 for insertion into corresponding alignment openings 55 in the top cell body 11. As illustrated, the alignment posts 45 are positioned near the corners of the rectangular bottom cell body 10 and are positioned between the inner O-ring groove 15 and the outer O-ring groove 16.

Spaced inwardly from the O-ring groove 15 is a feed spacer cavity 50 adapted to receive the feed spacer 20 (FIGS. 1 and 6). The cavity 50 is spaced inwardly from the O-ring groove 15 to avoid interference with the O-ring seal and is provided with a depth which is sufficient to accommodate the particular feed spacer being utlized. It is contemplated that different bottom cell bodies 10 can be utilized to accommodate feed spacers 20 of different thicknesses. A surface portion 46 is provided between the O-ring grooves 15 and 16 and a narrow surface portion 47 is provided between the inner O-ring groove 15 and the outer edge of the feed spacer cavity 50.

As illustrated in each of FIGS. 1, 2 and 3, the bottom cell body 10 is provided with a feed inlet 21 and a concentrate outlet 22. As illustrated best in FIGS. 2 and 3, both the inlet 21 and the outlet 22 comprise elongated bores extending completely through the cell body 10. During operation, the ends of the bores which are not connected with the feed and outlet fittings are provided with threaded plug members.

The feed inlet 21 is in communication with an elongated opening defining a feed manifold 48 extending substantially from one side edge of the feed spacer cavity 50 to the other. The purpose of the manifold 48 is to provide a supply of feed substantially across the entire feed spacer cavity 50 so that the feed can flow from one end of the cavity 50 to the other across one surface of the membrane. The concentrate outlet 22 is in communication with an elongated opening defining a concentrate manifold 49, which, like the manifold 48, extends substantially from one side edge of the feed spacer cavity 50 to the other to receive concentrate after flowing across one surface of the membrane.

As will be described in further detail below, the O-ring 12 (FIGS. 1 and 6) which is seated within the O-ring groove 15 is adapted for engagement with one surface of the membrane 19. When sealing pressure is applied by the cell holder, the other surface of the membrane 19 is forced toward sealing engagement with the bottom surface of the top cell body 11. The O-ring 14 which is seated within the outer O-ring groove 16 is adapted for direct sealing engagement with the bottom surface of the top cell body 11.

With specific reference to FIGS. 4 and 5, the top cell body 11 is shown to include a plurality of alignment post openings 55 adapted to receive the alignment posts 45 connected with the bottom cell body 10. The top cell body 11 also includes a permeate carrier recess 51 designed to receive the permeate carrier 18 (FIG. 1). The peripheral configuration and dimensions of the permeate carrier cavity 51 are substantially the same as the feed spacer cavity 50 within the bottom cell body 10. A sealing surface 52 is provided between the outer peripheral edge of the cavity 51 and the outer edge of the top cell body 11 for sealing engagement with a surface of the membrane 19 and the outer O-ring 14 as shown in FIG. 6.

A permeate outlet 32 is provided in the form of the elongated bore which extends completely through the cell body 11. One end of this outlet 32 is connected with the tube 34 for direction of permeate to a collection vessel 35 as shown in FIG. 1. The other end of the bore is provided with an appropriate threaded plug member when the unit is in operation. A plurality of permeate openings 54 are formed in the permeate carrier cavity 51 and are in communication with the permeate outlet 32. As illustrated best in FIGS. 4 and 5, these openings 54 are aligned with the elongated bore of the outlet 32 and extend vertically from the cavity 51 to the outlet 32.

Reference is next made to FIG. 6 showing a sectional view of the cell holder with a test unit positioned therein. As illustrated, the cell holder includes a base 36, a top piston holder 38 and a plurality of posts 39 maintaining the base 36 and piston holder 38 in vertically spaced relationship. The piston holder 38 includes a pneumatic or hydraulic fluid chamber or cavity 56. The chamber 56 is defined on one side by a diaphragm 57 which in turn cooperates with the piston 58 so that upon the introduction of pneumatic or hydraulic fluid through the valve 40, into the chamber 56, the piston 58 will be moved vertically downwardly toward the base 36. This movement in turn forces the top cell body 11 and the bottom cell body 10 into sealing engagement with one another. As shown, when such a sealing force is exerted, the outer O-ring member 14 in the groove 16 engages the bottom surface of the top cell body 11 directly, while the inner O-ring 12 engages one surface of the membrane and forces the other side of the membrane into sealing engagement with the bottom surface of the top cell body 11. In the preferred embodiment, the valve 40 is a conventional three way valve which selectively permits fluid to be introduced into the chamber 56, or bled from the chamber 56, or simply maintained in the chamber 56. The diaphragm 57 is retained about its peripheral edges by the piston girdle 59.

While pneumatic or hydraulic pressure is being supplied to the chamber 56, the cell can be operated by providing feed liquid into the feed inlet 21. This feed then passes through the manifold 48 and across the first surface of the membrane as a result of the feed spacer 20. The concentrate (that part of the feed which does not pass through the membrane) then flows through the concentrate manifold 49 and out through the concentrate outlet 22. The permeate (that portion of the feed which passes through the membrane) flows to the middle of the unit as a result of the permeate carrier 18 and exits through the permeate outlet 32 via the openings 54.

As illustrated in FIG. 6, the cell holder is provided with a pressure gauge 41 so that the pneumatic or hydraulic pressure within the chamber 56 can be observed. A piston return mechanism is also provided in the form of the elongated return stem 42 and the return spring 44. As shown, the stem 42 is rigidly secured to the piston 58. The spring 44 exerts an upward force on the head of the stem 42, defined by the nut 60 and washer 61, so that when pneumatic or hydraulic pressure is removed, the force of the spring 44 will return the piston 58. The stem 42 is sealed with respect to the top piston holder 38 by the O-ring 62. The lower end of the stem 42 is threadedly received by the piston 58.

Although the description of the preferred embodiment has been quite specific, it is contemplated that various modifications could be made without deviating from the spirit of the present invention. Accordingly, it is submitted that the scope of the present invention be dictated by the appended claims rather than by the description of the preferred embodiment.

We claim:

1. A cross-flow filtration membrane test unit for testing membrane and feed spacer materials usable in a cross-flow filtration device and for simulating the fluid dynamics of such a device comprising:

a bottom cell body having a feed inlet to receive fluid to be filtered, a concentrate outlet and a feed spacer cavity having first and second ends, said feed inlet, concentrate outlet and feed spaver cavity formed within said bottom cell body;

feed manifold means connecting said feed inlet to said first end of said feed spacer cavity and comprising an elongated opening formed in a portion of said bottom cell body and in communication with said first end of said feed spacer cavity;

concentrate manifold means connecting said concentrate outlet to said second end of said feed spacer cavity and comprising an elongated opening formed in a portion of said bottom cell body and in communication with said second end of said feed spacer cavity;

a top cell body having a permeate outlet formed therein;

means for receiving a test sample of test membrane between said top cell body and said bottom cell body;

said feed spacer cavity being shaped to facilitate generally straight line flow of the fluid to be filtered from said first end to said second end of said feed spacer cavity and said feed spacer cavity further being adapted to receive a test sample of test feed spacer;

alignment means for aligning said bottom cell body and top cell body relative to one another;

seal means comprising a test membrane seal member disposed adjacent one of said bottom and top cell bodies and for engagement with said test membrane to form a seal between said feed spacer cavity and said permeate outlet and further comprising a cell body seal member disposed in sealing emgagement between said top and bottom cell bodies around the entire periphery of said feed spacer cavity, said cell body seal member being spaced outwardly from said membrane seal member about the entire periphery thereof, said alignment means including a plurality of alignment posts connected with one of said top and bottom cell bodies and adapted for insertion into corresponding alignment openings formed in the other of said top and bottom cell bodies, said alignment posts and openings positioned between said membrane seal member and said cell body seal member.

2. The test unit of claim 1 wherein said cell body seal member and said membrane seal member are O-rings.

3. The test unit of claim 1 wherein said top cell body includes a permeate carrier receiving cavity formed therein.

4. The test unit of claim 3 including permeate openings extending between said permeate outlet and said permeate carrier cavity.

5. The test unit of claim 1 wherein each of said top and bottom cell bodied includes generally parallel top and bottom surfaces.

6. The test unit of claim 5 wherein each of said feed spacer cavity and said permeate carrier cavity has a generally rectangular cross-section when cut by a plane generally parallel to said top surface of said bottom cell body.

7. The test unit of claim 6 wherein the cross-sectional size and configuration of said permeate carrier cavity and said feed spacer cavity, when cut by a plane generally parallel to said top surface of said bottom cell body, is substantially the same.

8. The test unit of claim 1 wherein each of said top and bottom cell bodies includes generally parallel top and bottom surfaces and said feed spacer cavity has a generally rectangular cross-section when cut by a plane generally parallel to said top surface of said bottom cell body.

9. The test unit of claim 1 including a test sample of test membrane disposed between said top and bottom cell bodies.

10. The test unit of claim 9 including a test sample of test feed spacer disposed within said feed spacer cavity.

11. A cross-flow filtration membrane test unit for testing membrane and feed spacer materials for a cross-flow filtration device and for simulating the fluid dynamics for such a device comprising:

a bottom cell body having a feed inlet to receive fluid to be filtered, a concentrate outlet and a feed spacer cavity having first and second ends, said feed inlet, concentrate outlet and feed spacer cavity formed within said bottom cell body;

feed manifold means connecting said feed inlet to said first end of said feed spacer cavity;

concentrate manifold means connecting said concentrate outlet to said second end of said feed spacer cavity;

a top cell body having a permeate outlet formed therein;

means for receiving a test sample of test membrane between said top cell body and said bottom cell body;

said feed spacer cavity being shaped to facilitate generally straight line flow of the fluid to be filtered from said first end to said second end of said feed spacer cavity and said feed spacer cavity further being adapted to receive a test sample of test feed spacer;

alignment means for aligning said bottom cell body and top cell body relative to one another;

seal means comprising a test membrane seal member disposed adjacent one of said bottom and top cell bodies and for engagement with said test membrane to form a seal between said feed spacer cavity and said permeate outlet; and a force exerting means for exerting a sealing force relative to said top and bottom cell bodies, said force exerting means including a base, piston holder, means for maintaining said base and piston holder in relatively rigid, spaced relationship for receiving said top and bottom cell bodies therebetween and a piston adapted for limited movement relative to said piston holder between a force exerting position and a return position, said force exerting means further including a pneumatic/hydraulic cavity comprising a sealed diaphragm adapted to receive pneumatic/hydraulic fluid and a fluid supply means connected with said pneumatic/hydraulic cavity for selectively introducing pneumatic/hydraulic fluid into and bleeding pneumatic/hydraulic fluid from said cavity.

12. The test unit of claim 11 including return means for returning said piston to said return position.

13. The test unit of claim 12 wherein said return means includes an elongated stem connected with said piston and a return spring.

* * * * *